Dec. 23, 1952  E. G. ANGER  2,623,146
WELDER CONTROL SYSTEM
Filed Dec. 8, 1950
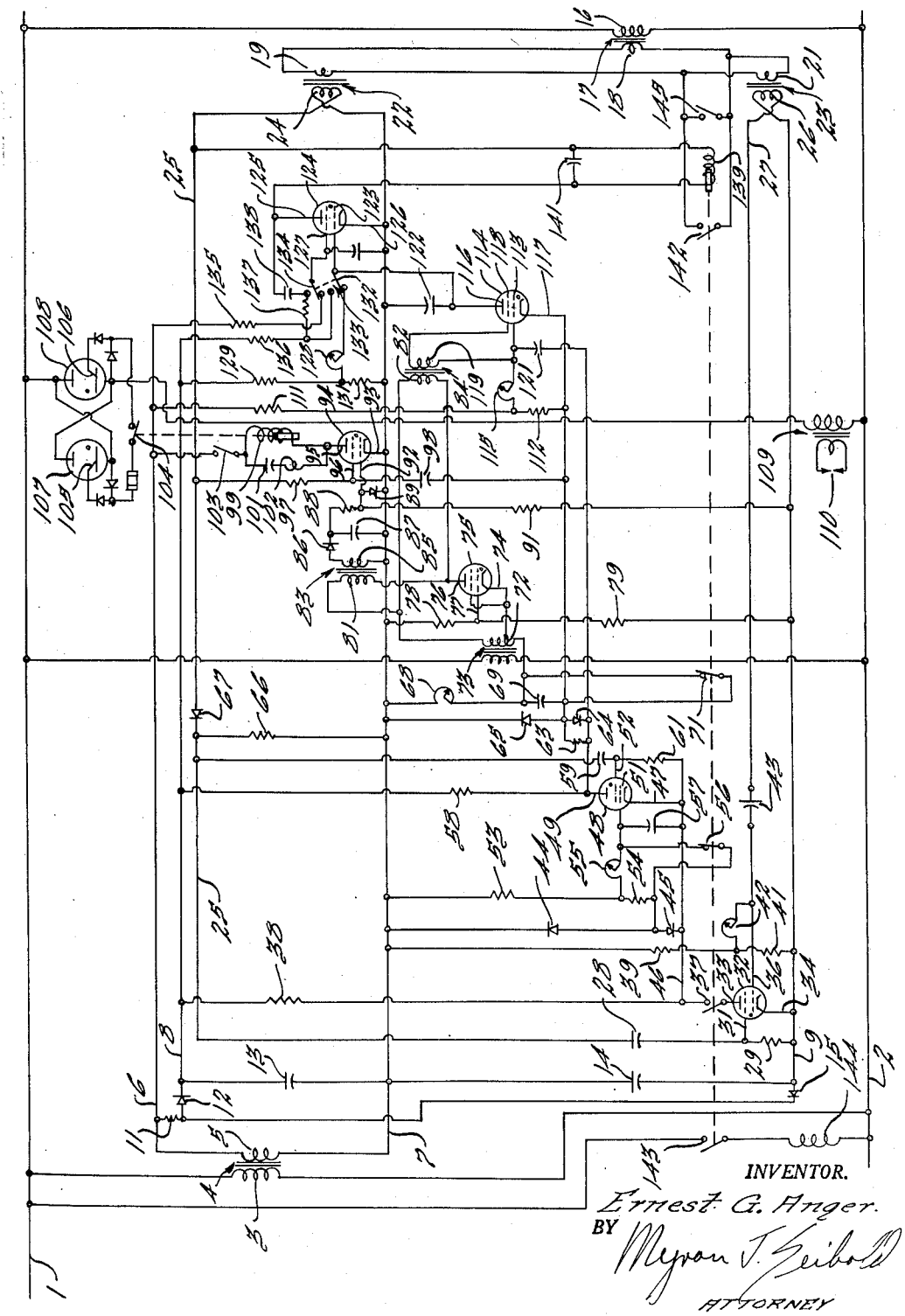
INVENTOR.
Ernest G. Anger.
BY
Myron J. Seibold
ATTORNEY Patented Dec. 23, 1952

2,623,146

UNITED STATES PATENT OFFICE 2,623,146

WELDER CONTROL SYSTEM

Ernest G. Anger, Wauwatosa, Wis., assignor to Square D Company, Detroit, Mich., a corporation of Michigan Application December 8, 1950, Serial No. 199,847

10 Claims. (Cl. 219—4)

This invention relates to an electronic circuit for controlling the passage of current to a welding load, and for effecting such current flow in synchronism with the application of pressure to the welding electrodes.

In many industrial welding applications, it is desirable to make successive welds with great rapidity, and in such applications it has been found that as many as 600 welds per minute can be made, using a 60 cycle source. A circuit for controlling such a welding system must operate so as to allow current flow through the welding transformer only during those periods in which the successively operating welding electrodes are pressed upon the work. Inasmuch as electrode pressure is effected by pressurized fluid flow controlled by an electric valve, it is clear that the welding control circuit must be designed so as to compensate for the inertial effects of such a pressure system. It is further necessary that the welding control circuit also provide for an initial "squeeze" period, which is that period during which pressure is applied to the welding electrodes before current flows therethrough, which is longer than subsequent "squeeze" periods in any sequence of welds so that the necessary weld rapidity may be effected.

It is an object of the present invention to provide an improved electronic welding circuit which operates in conjunction with a pressure system so as to pass current through the welding load only during that period in which substantial pressure is applied to the welding electrodes.

An object of the present invention is the provision of a circuit in accordance with the preceding object in which the initial "squeeze" period in a series of welds is longer than those in subsequent welds in the same series.

It is also an object to provide an electronic welder control circuit in which the initiation of the "hold" time period is independent of the actual flow of weld current.

A further object of the present invention is the provision of a circuit in which the timing of an electronic tube is initiated by simultaneously changing the potential of the cathode and control grid of the tube.

Another object of the invention is the provision of a timing circuit in which a first electronic tube starts conducting a predetermined time after conduction of a second electronic tube, and in which the first electronic tube remains conducting during another predetermined time following the cessation of conduction of said second electronic tube.

Other objects and features of the invention will be readily apparent to those skilled in the art from the specification and appended drawing illustrating certain preferred embodiments in which:

The figure is a diagrammatic representation of a welding circuit in which the circuit arrangement of the present invention is incorporated.

In the figure, the numerals 1 and 2 represent a pair of power supply lines which are connected to a source of energy which is not shown.

Connected across the supply lines is the primary 3 of a transformer 4 which has a secondary 5 which supplies voltage to a plurality of conductors 6, 7, 8 and 9. Connected between conductors 6 and 8 are a resistor 11, and a rectifier 12, the rectifier 12 serving with a capacitor 13 to supply a D. C. voltage between conductors 7 and 8. A capacitor 14 is provided which operates with a rectifier 15 to supply a D. C. voltage between conductors 7 and 9.

Also connected between supply lines 1 and 2 is the primary 16 of a transformer 17 having a secondary 18 which supplies electrical energy to primaries 19 and 21 of transformers 22 and 23 respectively. Transformer 22 has a secondary 24 which is connected between conductor 7 and a conductor 25. Transformer 23 has a secondary 26 which is connected between conductor 9 and conductor 27.

Serially connected between conductors 25 and 9 is a capacitor 28 and a resistor 29; and to a point between these two elements there is connected a shield grid 31 of an electronic tube 32, the "added squeeze" tube, having an anode 33 and a cathode 34, and a control grid 36 which is connected to conductor 27. The anode 33 is connected through relay contact 37 and resistor 38 to conductor 8.

Between conductors 7 and 9 there is disposed a pair of voltage-dividing resistors 39 and 41, and to a junction between these resistors there is connected one terminal of a rheostat 42, the other terminal of which is connected to the conductor 27 through a capacitor 43.

To the conductor 7 there is connected one terminal of a rectifier 44, the other terminal thereof being connected to another, opposed rectifier 45, which is also connected to a conductor 46 which, as will be seen from the figure, is connected to the anode 33 of tube 32 through the relay contact 37. To this conductor 46 there is connected the cathode 47 of a tube 48, the "squeeze time" tube, having an anode 49 and control and shield grids 51 and 52 respectively. The control grid 51 is electrically connected to a pair of voltage-dividing resistors 53 and 54, which parallel rectifier 44, through a rheostat 55. The resistor 54 is connected to the junction between rectifiers 44 and 45 and through a normally closed relay contact 56 to control grid 51. Disposed between cathode 47 and control grid 51 of tube 48 is a capacitor 57.

The anode 49 of tube 48 is connected to a conductor 8 through a resistor 58, and the shield grid 52 is connected to conductor 25 through a capacitor 59, a resistor 61 being disposed between the shield grid 52 and the cathode 47.

Electrically connected to the anode 49 is a resistor 63 parallelled by a rectifier 64, an opposed rectifier 65 being connected between rectifier 64 and conductor 7. To conductor 7 there is also connected one terminal of a resistor 66, the opposite terminal of which is connected to a rectifier 67 connected in line 25, the rectifier 67 serving to pass half wave pulsations through resistor 66.

Serially connected rheostat 68 and capacitor 69 are connected in parallel with rectifier 65, the capacitor 69 being paralleled by a normally closed relay contact 71. To the junction between rheostat 68 and capacitor 69 is connected a secondary winding 72 of a transformer 73, the primary of which is connected across the power supply lines 1 and 2. To an intermediate point on the secondary 72 is connected the cathode 74 of an electronic "weld time" tube 75 which has an anode 76 and a control grid 77, the latter element being connected to a point between a pair of voltage-dividing resistors 78 and 79 which are disposed between conductors 7 and 9. Connected in parallel with each other, and in series with the anode 76 of tube 75 are a pair of primary windings 81 and 82 of transformers 83 and 84 respectively. Transformer 83 has a secondary 85 which is connected to conductor 7, and across which is connected a rectifier 86 and a capacitor 87. In parallel with capacitor 87 is a resistor 88 and a rectifier 89, resistor 88 also being connected to conductor 9 through a resistor 91.

The rectifier 89 is connected between the control grid 92 and the cathode 93 of an electronic tube 94 which has an anode 95 and a shield grid 96, the latter element being connected to a junction between a resistor 97 and a capacitor 98 which are in series, and are electrically connected to conductor 25 and the anode 49 of tube 48.

In the anode circuit of tube 94 there is connected a relay coil 99 which is parallelled by tuned reactive elements comprising a capacitor 101 and an inductor 102. A manually operated "no weld" switch 103 is disposed between this circuit and conductor 6. The relay coil 99 controls the closure of a relay contact 104 which is disposed in circuit with the igniters 105 and 106 of electric discharge tubes 107 and 108 respectively, the electric discharge tubes being connected in conventional back-to-back arrangement to main power supply lines 1 and 2 through the primary of welding transformer 109. Across the secondary of transformer 109 are connected welding electrodes 110, which are adapted to be pressed against the work in the conventional manner upon energization of an associater valve solenoid to be subsequently described.

A pair of voltage-dividing resistors 111 and 112 are connected in series, one terminal of this series circuit being connected to conductor 6, the other terminal to the anode of tube 48 through resistor 63. To a point intermediate resistors 111 and 112 there is connected a control grid 113 of an electronic tube 114, through a rheostat 115. Tube 114 is the "hold time" tube and has an anode 116, a cathode 117, and a shield grid 118, and connected between the control and screen grid there is disposed the secondary 119 of transformer 84. Between control grid 113 and the anode 49 of tube 48 is connected a capacitor 121.

Anode 116 of tube 114 is connected to a capacitor 122, which is also connected to conductor 7, and to the control grid 123 of an electronic "off time" tube 124 which has an anode 125 and cathode 126, and a shield grid 127. The control grid 123 is connected through a rheostat 128 to an intermediate point between a pair of resistors 129 and 131 which are connected between conductors 7 and 8. Between control grid 123 and rheostat 128 is disposed one blade 132 of a double pole, double throw, "repeat-nonrepeat" switch 133, which has a second blade 134 connected to the shield grid 127. In the drawing, switch 133 is illustrated in the "repeat" position in which, as shown, shield grid 127 is connected through blade 134 and resistor 135 to conductor 6. Conductor 8 is connected to anode 125 of tube 124 through a pair of resistors 136 and 137 and a capacitor 138, the anode 125 also being connected to conductor 25 through a relay coil 139. Coil 139 is parallelled by a capacitor 141 which maintains the coil 139 energized during those half cycles of non-conduction of tube 124 which immediately follow conducting half cycles. The energization of relay coil 139 controls the operation of a relay contact 142, contacts 71, 56 and 37, and another relay contact 143 which controls the energization of a valve solenoid 144 connected between power supply lines 1 and 2, valve solenoid 144 controlling the application of fluid pressure to the welding electrodes 110.

An initiating contact 145 is provided across secondary 21 of transformer 23, the relay contact 142 in parallel therewith insuring the completion of a welding cycle should the initiating contact be opened at some time during such a cycle.

It should be noted that in the description of the circuit, certain conventional elements have been eliminated, such as surge bypass capacitors, cathode heaters, a thermal flow switch, etc., although these and other conventional elements would be present in an operating circuit. This elimination of conventional parts has been effected for purposes of simplicity, their position and function being well known to those familiar with the art.

The operation of the system will now be described. Connection of the main power supply lines 1 and 2 to a source of electrical energy will effect the energization of transformers 4, 73 and 17. The secondary 5 of transformer 4 supplies an A. C. voltage between conductors 6 and 7, while rectifiers 12 and 15 act in conjunction with capacitors 13 and 14 to supply D. C. voltages between conductors 7 and 8 and conductors 7 and 9. The secondary of transformer 73 supplies an A. C. voltage to the tube 75, as will be more fully described subsequently. Secondary winding 18 of transformer 17 supplies energy to the primary windings 19 and 21 of transformers 22 and 23 respectively. These transformers 22 and 23 are chosen so that transformer 22 is so much larger than transformer 23, that until the operation of initiating switch 145 substantially no voltage will appear at the secondary 24 of transformer 22, the entire voltage of secondary winding 18 of transformer 17 appearing across the primary winding 21 of transformer 23. The secondary 26 of transformer 23 will thereby be energized at this time.

Under these conditions, and prior to the operation of initiating switch 145, the relay coil 139 is deenergized and the relay contacts which it controls are in the position shown in the drawing. The anode of the "added squeeze" tube 32 is disconnected from conductor 8 by the open relay contact 37, and capacitor 43 is charged from secondary winding 26 of transformer 23 by grid conduction of tube 32, the charge on capacitor 43 placing the control grid 36 at a voltage which, except for brief moments of grid conduction, is substantially negative to that of a cathode 34.

The cathode 47 of "squeeze time" tube 48 is at substantially the relatively high D. C. voltage of conductor 8, while the anode 49 is negative with respect to the cathode 47 due to the voltage-dividing action of resistors 58 and 63. The control grid 51 of tube 48 is negative to cathode 47 due to the charge upon capacitor 57 which occurs by current flow through resistor 38, the relay contact 56 and rectifier 44.

As previously indicated, the transformer 73 supplies A. C. voltage between the anode and cathode of "weld time" tube 74, but this tube does not conduct due to the negative voltage upon the control grid 77 thereof derived from the voltage dividing action of the serially connected resistors 78 and 79.

When the "no weld" switch 103 is closed, the tube 94 is connected across secondary winding 5 of transformer 4. The shield grid 96 of tube 94 is substantially at the cathode 93 voltage, while the control grid 92 of tube 94 is negative with respect to the cathode 93 due to the voltage-dividing action of resistors 88 and 91, thus preventing tube conduction.

The cathode 117 of "hold time" tube 114 and the control and shield grids 113 and 118 respectively of tube 114 are at substantially the voltage of conductor 7. The anode 116 is slightly positive with respect to the cathode 117 due to the charge upon capacitor 122 from the grid voltage network of tube 124 when the "repeat-nonrepeat" switch 133 is in the "repeat" position indicated in the drawing. Capacitor 121 is charged by the voltage across resistor 63.

As previously indicated, there will be substantially no voltage across "off time" tube 124 when initiating switch 145 is open, the control grid 123 being positive with respect to the cathode 126 by the amount of charge upon capacitor 122.

A welding sequence is begun by closure of initiating switch 145 which deenergizes the transformer 23, voltage thereby appearing across the terminals of the secondary 24 of transformer 22. Tube 124 conducts upon positive excursion of its anode to energize relay coil 139 and to effect thereby operation of the relay contacts which it controls. Capacitor 141 is connected across the relay coil to maintain it energized as previously described. The contacts of relay 139 are so arranged that the normally closed contacts will open before the normally open contacts close. Therefore, the energization of relay coil 139 will first effect the opening of relay contacts 56 and 71. The opening of the relay contact 56 interrupts the fast charging circuit to the capacitor 57, the charge thereon being maintained however by current flow through rheostat 55 and resistor 54. Opening of relay contact 71 removes the short circuit across capacitor 69. Then the normally open contacts close, closure of relay contact 143 effecting energization of the valve solenoid 144 to initiate the application of pressure to the welding electrodes 110. Closure of relay contact 37 completes the circuit between the anode 33 of "added squeeze" tube 32 and the conductor 8. Closure of relay contact 142 establishes a holding circuit across the relay coil 139 so that, as previously indicated, the relay coil will not be deenergized should the initiating switch 145 be inadvertently opened during a welding sequence.

Immediately upon the deenergization of transformer 23, capacitor 43 begins to discharge, to initiate the squeeze delay timing, at a rate determined by the rheostat 42, control grid 36 approaching the voltage of the cathode 34. Positive voltage pulsations, being transmitted through rectifier 67, are synchronously transmitted to the shield grid 31 of tube 32 which will therefore begin to conduct upon the occurrence of one of these synchronous pulsations after capacitor 43 has sufficiently discharged. At this time "squeeze delay" is ended, and "squeeze time" is started.

Conduction of tube 32 instantly drops the cathode 47 of tube 48 to a highly negative potential which is approximately that of conductor 9, the voltage upon the anode 49 of squeeze tube 48 thereby becoming substantially positive with respect to the cathode 47 thereof. The capacitor 57 charge is dissipated during "squeeze time" through tube 32 and rheostat 55. At the conclusion of squeeze timing, the shield grid 52 of tube 48, which is receiving synchronous positive pulsations through the rectifier 67, causes tube 48 to conduct during one of these synchronized pulsations. This conduction of tube 48 causes the anode 49 thereof to drop in voltage due to current flow through resistor 58. This fall in voltage of the anode 49 causes the cathodes of tubes 75 and 114, the "weld time" and "hold time" tubes, to fall to a substantially negative voltage with respect to the anodes of the tubes. This voltage drop also causes the shield grid 96 of tube 94 to swing substantially negative, this negative voltage being transmitted to the shield grid through the capacitor 98. Referring first to the action at "weld time" tube 75, the drop in voltage of the cathode 74 thereof causes a positive voltage to appear at the control grid 77 thereof. Tube 75 will therefore conduct upon the next positive swing of anode 76 voltage from the transformer 73, to energize the primary windings 81 and 82 of transformers 83 and 84. The energization of transformer 83 causes the secondary winding 85 thereof to pass current through the rectifier 86 to charge the capacitor 87. This charge causes a positive voltage to appear upon the control grid 92 of the tube 94, this voltage being limited in amount by the rectifier 89. Tube 75 will continue to conduct, and will therefore continue to maintain the energization of transformers 83 and 84, for a time determined by the rate at which the capacitor 69 is charged, this rate being determined by the weld time rheostat 68. As will be seen from the drawing, the capacitor 69 will begin to charge as soon as tube 48 conducts. When the charge upon the capacitor 69 has been built up sufficiently, the cathode 74 of tube 75 will become positive with respect to the control grid thereof, the tube 75 then no longer conducting. When the rheostat 68 is set to effect a minimum value, tube 75 will conduct for only a half cycle.

The positive voltage upon the control grid 92 of tube 94 will not cause the tube 94 to conduct current until such time that a charge is built up upon the capacitor 98 which is sufficient to drive the shield grid 96 of tube 94 positive, this time being determined by the resistor 97. It should be noted that the capacitor 98 will be charged by a voltage having an A. C. ripple superimposed thereon so that the shield grid 96 is pulsatingly driven positive whereby tube 94 conduction will always occur at the beginning of a positive half cycle of voltage. The mechanical time lag in the operation of the relay contact 104 which is controlled by the relay coil 99 is such that weld current flow will be initiated at approximately the normal current zero of a welding transformer so that the welding current is initiated with a minimum transient. After the capacitor 98 has charged sufficiently, tube 94 will conduct at the synchronized instant aforementioned to energize the relay coil 99 and effect closure of the relay contact 104 in the igniter circuits of the back-to-back ignitron tubes 107 and 108 as previously indicated, at which time weld current flows. The closure of the relay contact 104 will, in conventional manner, effect current flow through the associated igniters 105 and 106 to cause the electric discharge tubes 107 and 108 to conduct alternate half cycles of current flow through the welding transformer 109. The relay coil 99 is parallelled by capacitor 101 which will maintain the relay coil 99 energized during negative half cycles which follow a conducting half cycle of the tube 94.

Tube 94 will continue to conduct until such time, after the cessation of tube 75 conduction, as the charge upon the capacitor 87 in the control grid circuit of tube 94 has sufficiently dissipated its charge so that the control grid is driven negatively to the voltage determined by the voltage-dividing resistors 88 and 91. Upon termination of conduction of tube 94, the tuned elements comprising the capacitor 101 and the inductor 102 will, during the second half cycle following the last conducting half cycle through tube 94, effect a rapid deenergization of the relay coil 91 and drop out of the relay contact 104 to prevent further weld current flow. As indicated in applicant's copending application, Serial No. 148,190 filed March 7, 1950, for Electric Control Circuit, this drop-out will not occur at a time which would cause saturation of the welding transformer. It will therefore be seen that the tube 94, which conducts to effect operation of switch 104 and thereby cause weld current flow, has been initiated after a predetermined delay and that this delay is independent of the operation of the solenoid valve. Weld current flow is thereby delayed to compensate for the inertial effects of the pressure system, so that current will pass through the welding electrodes only at those times during which the electrodes are applying substantial pressure to work interposed therebetween. Furthermore, tube 94 will continue to be conductive, and weld current will continue to flow, for a predetermined time after tube 75 has ceased to conduct.

As previously indicated, upon the conduction of tube 48 the cathode 117 of the "hold time" tube 114 is driven substantially negative whereby a substantal positive voltage appears upon the anode 116 thereof. Tube 114 will not immediately conduct, however, due to the initial charge upon capacitor 121 which was established before operation of initiating switch 145. Upon the conduction of tube 75, and the energization of transformer 84 which results therefrom, and before capacitor 121 can discharge, the secondary winding 119 of transformer 84 will act to drive the shield grid 118 of tube 114 positive in pulsations to thereby maintain a charge upon capacitor 121. Upon termination of tube 75 conduction, transformer 84 is deenergized, and the charge upon capacitor 121 is dissipated through the "hold time" rheostat 115 at a rate dependent upon its setting whereby tube 114 will begin to conduct. Tube 114 conduction immediately charges capacitor 122, connected in the grid circuit of tube 124, in such a way that the tube 124 is immediately cut off. Cessation of current flow through tube 124 deenergizes the relay coil 139 and returns the relay contacts controlled thereby to the position indicated in the drawing. As these relay contacts are operated, tubes 32, 48 and 114 are immediately cut off, the cathodes of tubes 48 and 114 returning to their initial positive voltages. The opening of relay contact 143 deenergizes the valve solenoid 144 to begin removal of air pressure from the electrodes. The opening of relay contact 37 breaks the anode circuit of tube 32; closure of relay contact 56 reestablishes the charging circuit for capacitor 57 which charges to prevent tube 48 conduction. Closure of relay contact 71 short circuits the timing capacitor 69 to remove the charge therefrom, and opening of relay contact 142 returns control to the initiating contact 145.

If the repeat-nonrepeat switch 133 is in the "repeat" position illustrated in the drawing, and the initiating switch 145 is held closed upon termination of the welding sequence, off timing proceeds as capacitor 122 discharges through the rheostat 128 to remove the negative voltage upon the control grid 123 of tube 124 thereby permitting it to refire. The shield grid 127 of tube 124 is supplied with an A. C. voltage through resistor 135 which is of opposite polarity to the anode voltage of tube 124 so that the tube 124 will begin to conduct only at the beginning of a positive half cycle of anode voltage, thereby ensuring synchronous initiation of a succeeding weld sequence. Relay coil 139 will thereby be reenergized, and the contacts controlled thereby will be operated. The reclosure of relay contact 37 will cause immediate conduction of the "squeeze delay" tube 36 in the subsequent weld sequence, due to the fact that transformer 23 had been deenergized since the initial closure of the initiating contact 145 at the beginning of the control weld sequence, and the capacitor 43, therefore, has no charge thereon. At the minimum timing setting of the rheostat 55, "squeeze time" tube 48 will immediately conduct upon the conduction of "squeeze delay" tube 32 so that in these subsequent weld sequences the actual period between the initation of pressure and the flow of weld current is shorter than was the similar period of the first weld sequence. The operation of the circuit upon conduction of tube 48 is then as has been previously described.

If the switch 133 is in the "non-repeat" position, A. C. anode voltage will be applied to the shield grid 127 of the tube 124 through the capacitor 138, current from the shield grid maintaining a negative charge upon the capacitor 122 to prevent it from timing out and to thereby maintain the tube 124 in its cut-off position. Tube 124 will not conduct until the initiating switch 145 is opened to eliminate the voltage of the secondary winding 24 of transformer 22, thereby eliminating the charging circuit for the capacitor 122 through the shield grid 124, whereby the charge upon capacitor 122 will quickly dissipate to permit tube 124 to again conduct upon reclosure of initiating switch 145.

It will be seen that the circuit arrangement of the present invention provides a weld sequencing control in which initiation of the "hold time" period is independent of weld current flow, so that the "hold time" period may be initiated before weld current flows, permitting in effect, a "negative" hold time if such be necessary to effect synchronism between the flow of weld current and electrode pressure. Furthermore, as previously described, the length of the period between the application of pressure to the welding electrodes and the flow of weld current will be longer in the first welding sequence than in subsequent welding sequences which occur without the initiating switch being opened. It will, therefore, be seen that this combination of features permits welds, in circuits using fluid pressure for effecting electrode pressure, to be made with great rapidity, the timing elements being readily adjustable so that weld current will flow only when substantial pressure is exerted by the welding electrodes, regardless of the inertial effects of the welding electrodes and the pressure system associated therewith.

What is claimed is:

1. In a timing circuit, an electronic tube having a pair of principal electrodes and a control electrode, a capacitor, means connecting one terminal of said capacitor to said control electrode, means for charging said capacitor, means for initiating a timing period, means for electrically connecting one of said principal electrodes to the other terminal of said capacitor upon operation of said initiating means, means for changing the potential of said one of said principal electrodes upon operation of said initiating means, and means for adjustably discharging said capacitor whereby the voltage of said control electrode will gradually approach that of said one of said principal electrodes after operation of said initiating means.

2. In a timing circuit, means for initiating a timing period, a first electronic tube, a second electronic tube, means for initiating the conduction of said first electronic tube upon operation of said initiating means, means for initiating conduction of said second electronic tube a first predetermined time after the operation of said first electronic tube, adjustable timing means for terminating the conduction of said first electronic tube, means for terminating the conduction of said second electronic tube a second predetermined time after the termination of conduction of said first electronic tube, and means operated by said second electronic tube for effecting a control function.

3. In a welding device including electrodes movable relatively by fluid pressure, initiating means, first means operable upon operation of said initiating means for effecting the application of pressure to said electrodes, a first electronic tube, timing means for effecting the conduction of said first electronic tube an adjustable time after operation of said first means, a second electronic tube rendered conductive by conduction of said first electronic tube, means for interrupting the conduction of said second tube, a third electronic tube, means for effecting conduction of said third tube a predetermined time after conduction of said first tube, means for stopping conduction of said third tube a predetermined time after cessation of conduction of said second tube, means responsive to conduction of said third tube for effecting load current flow, and means controlled by said second tube for interrupting the operation of said first means an adjustable time after cessation of conduction of said second tube whereby the removal of pressure from the electrodes may be started before the interruption of load current flow.

4. The device as claimed in claim 3 in which said timing means for effecting the conduction of said first electronic tube an adjustable time after operation of said initiating means includes an additional electronic tube and means for connecting said additional electronic tube and said first electronic tube in series whereby said first electronic tube may conduct only during the conduction of said additional electronic tube.

5. The device as claimed in claim 3 in which said timing means for effecting the conduction of said first electronic tube an adjustable time after operation of said initiating means includes an additional electronic tube and means for connecting said additional electronic tube and said first electronic tube in series, adjustable means for preventing the conduction of said additional electronic tube until a predetermined time after the operation of said initiating means, and adjustable means for preventing the conduction of said first electronic tube until a predetermined time following the conduction of said additional electronic tube.

6. The device as claimed in claim 3 in which said timing means for effecting the conduction of said first electronic tube an adjustable time after operation of said initiating means includes an additional electronic tube and means for connecting said additional electronic tube and said first electronic tube in series, adjustable means for preventing the conduction of said additional electronic tube until a predetermined time after the operation of said initiating means, and adjustable means for preventing the conduction of said first electronic tube until a predetermined time following the conduction of said additional electronic tube, said adjustable means for preventing the conduction of said additional tube for a predetermined period including means disabled by operation of said initiating means whereby the conduction of said additional tube is delayed only once during any single period of operation of said initiating means.

7. The device as claimed in claim 3 in which said timing means for effecting the conduction of said first electronic tube an adjustable time after operation of said initiating means includes an additional electronic tube and means for connecting said additional electronic tube and said first electronic tube in series, adjustable means for preventing the conduction of said additional electronic tube until a predetermined time after the operation of said initiating means, and adjustable means for preventing the conduction of said first electronic tube until a predetermined time following the conduction of said additional electronic tube, said adjustable means for preventing the conduction of said additional tube for a predetermined period including a transformer and a capacitor charged thereby, operation of said initiating means shorting out said transformer whereby the conduction of said additional tube is delayed only once during any single period of operation of said initiating means.

8. The device as claimed in claim 3 in which said means for effecting conduction of said third tube a predetermined time after conduction of said first tube includes means responsive to conduction of said second tube.

9. The device as claimed in claim 3 in which said third tube has a pair of principal electrodes and a pair of control electrodes, said means for effecting conduction of said third tube including a first capacitor connected to one of said control electrodes charged subsequent to conduction of said first tube, and a second capacitor charged by conduction of said second tube connected to the other of said control electrodes.

10. The device as claimed in claim 3 in which said means controlled by said second tube for interrupting the operation of said first means includes a fourth electronic tube having a pair of principal electrodes and a control electrode, a transformer, means connecting the primary of said transformer in series with said second tube, a capacitor, means connecting said capacitor to said control electrode, means connecting the secondary of said transformer to said capacitor, and means for adjustably discharging said capacitor upon cessation of conduction of said second tube and consequent deenergization of said transformer.

ERNEST G. ANGER.

REFERENCES CITED

The following references are of record in the file of this patent:

UNITED STATES PATENTS

| Number | Name | Date |
| --- | --- | --- |
| 2,294,672 | Livingston | Sept. 1, 1942 |
| 2,333,363 | Collom | Nov. 2, 1943 |
| 2,493,839 | Thomas | Jan. 10, 1950 |
| 2,533,318 | Hartwig | Dec. 12, 1950 |
| 2,545,998 | Hartwig | Mar. 20, 1951 |